United States Patent [19]
Kersten et al.

[11] 3,723,522
[45] Mar. 27, 1973

[54] PRODUCTION OF THIOUREA

[75] Inventors: Hilde Kersten, Trennfurt; Gerhard Meyer, Obernburg; Clemens Neuhaus, Erlenbach, all of Germany

[73] Assignee: Akzona Incorporated, Asheville, N.C.

[22] Filed: Nov. 12, 1970

[21] Appl. No.: 89,038

[30] Foreign Application Priority Data

Nov. 14, 1969 Germany.....................P 19 57 202.2

[52] U.S. Cl. ..............................................260/552 R
[51] Int. Cl. ............................................C07c 157/00
[58] Field of Search ...................................260/552 R

[56] References Cited

UNITED STATES PATENTS 2,173,067   9/1939   Roblin.................................260/552
2,393,917   1/1946   Lewis..................................260/552
2,353,997   7/1944   Cooper................................260/552

Primary Examiner—Leon Zitver
Assistant Examiner—Michael W. Glynn
Attorney—Johnston, Root, O'Keeffe, Keil, Thompson & Shurtleff

[57] ABSTRACT

A two-stage process for the production of thiourea from hydrogen sulfide and calcium cyanamide in which the hydrogen sulfide is introduced into an aqueous suspension of the calcium cyanamide in a first stage at temperatures below about 80°C. and advantageously no higher than about 40°– 60°C. under a reduced pressure of less than about 300 mm. Hg and the resulting mixture is then further reacted in a second stage at about 60°C. to 100°C. under approximately normal atmospheric pressure. The process is especially useful for the continuous production of thiourea.

7 Claims, No Drawings

PRODUCTION OF THIOUREA

Various processes are known for the production of thiourea from free cyanamide itself or one of its salts and an inorganic sulfide such as hydrogen sulfide, calcium sulfide, barium sulfide or ammonium sulfide. In these known processes, the reaction has been accomplished in the presence or absence of water and in some instances with the addition of compounds which cause hydrogen sulfide to be set free from the sulfides and which cause the formation of difficulty soluble alkaline earth metal salts. It is further known that the reaction can be carried out at normal or elevated temperatures as well as at normal or superatmospheric pressures.

Although calcium cyanamide is a very desirable initial reactant, it hydrolyzes easily and further reacts in alkaline medium with the formation of dicyandiamide and other undesirable by-products. In order to repress the formation of these by-products, the reaction has been carried out at relatively low temperatures of about 20° – 30°C. However, when attempting to react hydrogen sulfide with the calcium cyanamide under such low temperature conditions, it is necessary to proceed very slowly on account of the high heat of reaction, e.g. such that a prohibitively long period of time is required for gassing the reaction mixture with hydrogen sulfide.

According to one improvement suggested in U. S. Pat. No. 2,353,997, the reaction of calcium cyanamide with hydrogen sulfide in the presence of water is carried out slightly below 100°C., e.g. at about 80° – 95°C., whereby the reaction proceeds rapidly and without the formation of substantial amounts of by-products. As pointed out in this patent, however, this reaction is successful only if carried out in the presence of a large excess of the sulfide, e.g., hydrogen sulfide, so that the unreacted portion of the sulfide must be recovered or else accepted as a complete loss. The process proposed in the patent partly overcomes this problem by carrying out the reaction in two stages wherein the reaction is initiated in a first stage by adding calcium cyanamide to a large excess of hydrogen sulfide and then adding fresh calcium cyanamide in a second stage for reaction with the initial excess of hydrogen sulfide. This procedure is very cumbersome and is not at all suitable for a commercial continuous production of thiourea. In addition to the problems of adding calcium cyanamide and hydrogen sulfide at various adjusted rates, it is necessary to centrifuge or filter the intermediate reaction product from the first stage before the reaction is carried out with gradually decreasing amounts of hydrogen sulfide in the second stage. Such complications should be avoided in commercial practice.

A further improvement of this process has been suggested in U. S. Pat. No. 2,393,917 wherein it is pointed out that one can avoid the employment of hydrogen sulfide in substantial stoichiometric excess as previously required through at least the greater part of the reaction. In order to accomplish this result, an aqueous suspension of an alkaline earth metal hydroxide is first saturated with hydrogen sulfide at a temperature of about 15° – 20°C. in order to form an aqueous solution of an alkaline earth metal hydrosulfide. This intermediate solution is then heated to a temperature of about 80° – 95°C. and calcium cyanamide is then added in small portions while continuing the addition of hydrogen sulfide. The yields of this process are relatively low, particularly when carried out without the addition of an alkaline earth metal hydroxide, and it is generally necessary to filter the reaction mixture before the reaction is completed, i.e., between successive additions of the calcium cyanamide. This procedure is likewise cumbersome and quite unsuitable for the continuous production of thiourea.

One object of the present invention is to provide a substantial improvement in the production of thiourea from hydrogen sulfide and calcium cyanamide by means of a two-stage process which can be carried out in a relatively short period of time to achieve high yields and a very pure thiourea product. It is also an important object of the invention to provide a process for the continuous production of thiourea in which a large excess of hydrogen sulfide can be avoided and in which the reaction conditions and recovery of the final product are greatly simplified. These and other objects and advantages of the invention will become apparent upon consideration of the following detailed disclosure.

It has now been found, in accordance with the invention, that one can achieve a substantially improved process for the production of thiourea by introducing hydrogen sulfide in a first stage into an aqueous suspension of calcium cyanamide for reaction therewith at temperatures of from about 10° to 80°C. under a reduced pressure corresponding to the vapor pressure of the reaction mixture at the reaction temperatures in this first stage up to about 300 mm. Hg and then completing the reaction in a second stage at a temperature of about 60° to 100°C. under approximately normal atmospheric pressure.

The phrase "normal atmospheric pressure" is employed herein to define a pressure of approximately 1 atmosphere, i.e., as exists under normal atmospheric conditions. One can likewise refer to "normal temperature" or "room temperature" as defining that temperature which normally occurs under laboratory or factory conditions. These so-called normal reaction conditions do not exclude the possibility of working under slightly elevated temperatures and pressures.

In carrying out the reaction according to the invention, it is preferable to introduce the bulk of the hydrogen sulfide into the first stage at a temperature of about 20° to 60°C., i.e., so that the temperature of this first stage does not substantially exceed 60°C. For example, it has been found particularly advantageous to initially introduce the hydrogen sulfide into an aqueous suspension of calcium cyanamide at room temperature and then, after the reaction mixture attains a temperature of about 40°C., to further introduce the remaining portion of hydrogen sulfide at temperatures in the range of about 40°–60°C. The hydrogen sulfide is introduced continuously, and one can proceed in such a manner that the hydrogen sulfide is first introduced into the aqueous calcium cyanamide suspension at room temperature and the temperature of the reaction mixture is then permitted to rise continuously to a maximum of 60°C. If the hydrogen sulfide is introduced into an already hot calcium cyanamide suspension at elevated temperatures, substantially lower yields are obtained. It is therefore especially desirable to maintain the first stage reaction temperature as low as possible during the introduction of the hydrogen sulfide, and if desired, the first stage can be subdivided into two or more reaction periods so as to gradually increase the temperature throughout the first stage.

It is especially preferred to employ the hydrogen sulfide in liquid form. However, good results have also been achieved with gaseous hydrogen sulfide even though the rate at which it can be introduced into the aqueous reaction mixture is somewhat slower. Liquid hydrogen sulfide is of course especially preferred in a continuous process.

The time taken for introducing the hydrogen sulfide is significant in carrying out the process of the invention. The yields of thiourea are generally higher, the more quickly the amounts of hydrogen sulfide are supplied for the quantitative reaction of the available calcium cyanamide. If the hydrogen sulfide is introduced too slowly, the yield is correspondingly reduced. This loss of yield is especially noticeable if the reaction in the first stage is carried out predominantly between 60°C. and 80°C., i.e., if the hydrogen sulfide were to be added for the most part at such higher temperatures.

In contrast to one of the better known processes of the prior art, it is not necessary to add hydrogen sulfide in a large excess, and the process of the present invention is therefore preferably carried out with an approximately sthoichiometric amount of the hydrogen sulfide with reference to the calcium cyanamide. In general, the reaction proceeds according to the following equation:

Accordingly, the molar ratio of $H_2S:CaNCN$ is normally maintained below about 1.2:1 and preferably in a range of approximately 1:1 to 1.1:1. Of course, where the reaction is initiated by gradually introducing the hydrogen sulfide into the aqueous suspension, there will be a substantial excess of the calcium cyanamide until all of the hydrogen sulfide has been added.

In place of water as the aqueous medium for the reaction, it will be understood that one can also employ a mother liquor which contains thiourea in solution. The proportional amounts of the calcium cyanamide and water or thiourea-containing mother liquor can be varied over a wide range. However, it is preferable to work within a weight ratio of $H_2O:CaNCN$ of about 1:1 to 5:1. One can also work with a large excess of water, i.e., with much more dilute suspensions of the calcium cyanamide, but this will normally be avoided for economical reasons.

The process according to the invention can also be carried out in the presence of conventional catalysts or reaction accelerators, e.g., in the presence of about 0.5 percent by weight of sulfur or similar small catalytic amounts of ammonia (with reference to the calcium cyanamide). Such additives may also be introduced separately or continuously at the same time that the hydrogen sulfide is introduced.

The process of the invention avoids the serious disadvantages of the known processes, including the partial hydrolysis of the calcium cyanamide due to the long periods of time required in carrying out the reaction and/or the necessarily higher reaction temperatures. It was discovered that when working under a reduced pressure in the first reaction stage, the temperature is controlled by directly leading off the high heat of reaction by evaporation of water. Thus, the temperature of the reaction mixture in the first stage during introduction of the hydrogen sulfide can be regulated exclusively by the rate of vaporization of the water.

It is therefore especially desirable to carry out the first stage in the presence of a sufficient excess of water so that the heat of reaction can be easily removed by evaporative cooling, i.e., by evaporating water from the reaction mixture. Furthermore, this vaporized water can be easily refluxed, i.e., condensed and returned to the reaction mixture in the first stage, while maintaining the liquid reaction mixture under a free gas space at subatmospheric pressure. This subatmospheric pressure thus generally corresponds to the vapor pressure of the water at the temperature in the first stage, but should be maintained below about 300 mm. Hg. Of course, other supplemental cooling means may also be employed in the first stage, and these and other minor variations should be included within the scope of the invention.

The process can be carried out either discontinuously or continuously. However, it is especially suitable for the continuous technical production of thiourea on a commercial scale because the reaction velocity is very high. Moreover, it is not necessary to employ pure reactants, and excellent results are achieved even when employing a relatively impure crude calcium cyanamide.

When carrying out the reaction as a batch or discontinuous two-stage process, it is preferable to first prepare the crude calcium cyanamide suspension in water or a mother liquor containing thiourea together with 0.5 percent sulfur, and to initiate the reaction by introducing hydrogen sulfide at room temperature into the suspension maintained under the required vacuum or reduced pressure. Because of the high heat of reaction, the boiling temperature of the water under the conditions of reduced pressure is very rapidly attained. After all of the hydrogen sulfide has been introduced, e.g., in a stoichiometric amount, the reaction mixture is then preferably brought up to normal atmospheric pressure and further reacted for about 30 to 60 minutes at 60° to 100°C. The best results have been achieved when this further reaction at atmospheric pressure is carried out at temperatures between about 70° and 80°C. After the reaction is completed, the reaction mixture can be worked up in a conventional manner in order to recover a concentrated solution of the thiourea.

In order to carry out a continuous production of thiourea, the aqueous suspension of a crude calcium cyanamide as one reactant and the hydrogen sulfide as the other reactant can be introduced simultaneously into a suitable reaction vessel or still maintained under reduced pressure. The water employed for the calcium cyanamide suspension may be a dilute aqueous solution of thiourea. The reaction vessel or still provided for this purpose should be only partly filled with the reaction mixture, e.g., up to about two-thirds of its capacity, so as to provide a free gas space above the reaction mixture which can be maintained under a vacuum. The reaction vessel is also preferably equipped with an efficient stirring or mixing means, and the gas space is preferably in fluid connection with a reflux condenser for the purpose of returning condensed water back to the reaction mixture. The hydrogen sulfide should be introduced directly into the liquid reaction mixture, and surprisingly very little if any hydrogen sulfide is withdrawn from the gas phase above the reaction mixture. Under steady-state conditions, the aqueous reaction mixture is essentially maintained at its boiling temperature under the conditions of reduced temperature, and it is therefore preferable to maintain a substantially constant temperature in this first stage of below 60°C. and preferably within the range of about 40° – 60°C.

In order to achieve very high dosing rates of both the hydrogen sulfide and the aqueous calcium cyanamide suspension, it is especially advantageous to work with two or several reaction vessels or stills in a cascade, i.e., so that the reaction mixture flows continuously from one reaction vessel to the next in series while maintaining a uniform temperature and reduced pressure in each reaction vessel. Similar results can also be achieved in a single reaction tower, preferably with a continuous cocurrent flow of the reactants downwardly through the tower while withdrawing water vapor from the top of the tower. These and similar arrangements for continuous operation of the first reaction stage will be readily apparent to those skilled in this art.

The reaction mixture is then removed or continuously withdrawn from the bottom of the first stage reaction vessel or the last vessel in series and pumped into a second reactor for completion of the reaction. For example, it is preferable to employ as the second stage reactor an elongated reaction tube which is easily operated under approximately normal atmospheric pressure. In order to prevent sedimentation or a settling out and collection of the solids in the second stage, it is desirable to equip the reaction tube with suitable stirring, mixing or agitating apparatus or else substantially increase the rate of flow of the reaction mixture through this second stage by means of narrowing the cross-section of the reaction tube, i.e., to provide a venturi effect. This second stage reaction is thus operated at approximately normal pressure and at temperatures between about 60° and 100°C., preferably from about 70° to 80°C. The cross-sectional or average retention time in this second stage should amount to about 0.1 to 2 hours, preferably 0.5 to 1 hour.

The reaction mixture can then be continuously withdrawn from the second stage and again worked up in a conventional manner as in the discontinuous process. It is especially advantageous, however, to first separate the solids content of the reaction mixture consisting predominately of calcium hydroxide in the form of a so-called lime sludge, e.g., by filtration or centrifuging the discharged reaction mixture in a continuous manner. The initial filtrate can be directly evaporated for removal of water and concentration of the thiourea in the filtrate. The filtered off solids or lime sludge is preferably washed with water so as to substantially recover all of the thiourea, this washing procedure also being conventional in this art. The wash water can be combined with the initial filtrate containing the bulk of the thiourea in solution, or the wash water may be recycled to the first reaction stage, fresh calcium cyanamide being suspended and fed together with this mother liquor into the first stage. In this manner, very good yields of thiourea can be recovered while continuously carrying out the two-stage reaction under relatively easily controlled conditions.

The process of the invention is further illustrated by the following examples, it being understood that the invention is not restricted to these examples. All parts and percentages are by weight unless otherwise indicated.

EXAMPLES 1 – 6

A reaction vessel was filled to about two-thirds of its capacity with an aqueous suspension of calcium cyanamide having the following composition:

2 parts by weight $H_2O$,
1 part by weight crude calcium cyanamide,
1 percent by weight (with reference to CaNCN) conc. aqueous ammonia,
0,5 percent by weight (with reference to CaNCN) sulfur.

The reaction vessel was then closed and evacuated for carrying out the first stage of the reaction. Hydrogen sulfide was then introduced over a certain period of time into the aqueous suspension in an approximately stoichiometric ratio with reference to the CaNCN (within a molar ratio of $H_2S$:CaNCN of 1.1:1 to 1:1). The temperature of the reaction mixture was controlled during the introduction of the hydrogen sulfide by means of gradually raising the vapor pressure in the free gas space above the liquid contents of the vessel, the first example employing a constant pressure so as to maintain a constant temperature. All of the hydrogen sulfide was added in every instance at a pressure below 300 mm. Hg. At the low initial reduced pressure, the reaction mixture rapidly came to the boil and the vaporized water was continuously condensed and returned to the reaction vessel.

After all of the hydrogen sulfide had been introduced, the reaction mixture was released to normal atmospheric pressure and heated for approximately 30 minutes longer at a temperature between 70°C. and 80°C. for completion of the reaction. The resulting mixture was worked up in the conventional manner for recovery of the thiourea product, i.e., by filtering off the solids and washing them to remove any residual content of thiourea and combining the wash water with the original filtrate. This filtrate was then concentrated by evaporation of water and a crystalline thiourea separated therefrom in the usual manner. The resulting thiourea was colorless and had a melting point of 170°C.

The reaction conditions for each example are set forth in the following Table I wherein $t_A$ identifies the temperature of the initial aqueous suspension of calcium cyanamide; $t_E$ identifies the temperature at which the bulk of the hydrogen sulfide had been introduced, i.e., near the end of the first stage of the reaction; and $t_S$ identifies the temperature in the second stage of the reaction. The yield is calculated with reference to the initial amount of CaNCN. In all cases, the reaction was initiated at a temperature of 20°C. The temperature was then raised in the first stage while adding hydrogen sulfide in Examples 2–6.

TABLE I

| Example No. | H$_2$S Introduction Time (min.) | Reaction Temperatures $t_A$ (°C.) | $t_E$ (°C.) | $t_S$ (°C.) | First Stage Pressure (mm. Hg) | Yield (%) |
|---|---|---|---|---|---|---|
| 1 | 60 | 20 | 20 | 70 | 20 | 95.0 |
| 2 | 60 | 20 | 40 | 70 | 40 | 94.5 |
| 3 | 10 | 20 | 50 | 70 | 75 | 96.0 |
| 4 | 60 | 20 | 70 | 70 | 180 | 92.0 |
| 5 | 60 | 20 | 80 | 80 | 280 | 81.0 |
| 6 | 10 | 20 | 80 | 80 | 280 | 91.0 |

It will be noted that the yields of thiourea can be easily maintained above 90 percent by working within the conditions of the invention and preferably such that the first stage temperature is maintained below 70°C. and especially below 60°C. However, even if higher temperatures up to about 80°C. are attained in the first stage, e.g., near the completion of the H$_2$S introduction, good yields are still possible if the H$_2$S is added at a sufficiently rapid rate. Such rapid addition is preferably achieved by supplying liquid H$_2$S into the aqueous suspension.

The best results are obtained by working within an intermediate set of reaction conditions with relatively rapid introduction of the H$_2$S, and although the foregoing examples essentially represent two separate batch stages, it will be apparent that the conditions are very easily accommodated into a continuous two-stage reaction having a continuous introduction of the reactants and cocurrent flow through both stages, including a gradual transition of temperature from the first stage to the second stage. Such a continuous process is illustrated by the following example.

EXAMPLE 7

The first stage of the reaction is carried out in a 50 liter capacity mixing vessel equipped with a reflux condenser and separate lines for the introduction of the initial reactants and a discharge conduit at the bottom of the vessel. The reaction mixture is maintained at a level of about 60 percent of the capacity of the vessel (i.e., at about 30 liters) with the free gas space above the liquid level being held under a reduced pressure of from 40 to 100 mm. Hg and at a corresponding temperature of 40° to 60°C. Initiation of the reaction can take place as in a batch process, but once placed in continuous operation, both stages of the reaction are carried out at a substantially constant temperature and pressure with continuous introduction of the reactants and continuous withdrawal of the reaction mixture.

Under such steady-state conditions, there are introduced into the first stage reaction vessel about 600 kilograms per hour of a suspension of crude calcium cyanamide together with 0.5 percent sulfur in water (or in a dilute aqueous solution of thiourea) in a proportion by weight of H$_2$O:CaNCN of about 3:1 and also about 42.5 kilograms per hour of hydrogen sulfide in gaseous or liquid form. (The active N-content in the crude calcium cyanamide amounts to 23.3 percent).

From the bottom of the first stage reaction vessel, the reaction mixture is continuously withdrawn and pumped into a 600 liter capacity reaction tube equipped with a mixer, this tube having a height of 3 meters and a diameter of 0.5 meters with continuous mixing over its entire height to prevent sedimentation. Suitable inserts or baffles are provided within the reaction tube to ensure that the reaction mixture flows therethrough in a substantially uniform strea, i.e., with approximately the same flow velocity over its height. This second stage reactor is maintained at a temperature of 70° to 80°C. and under substantially atmospheric pressure in the sense that the liquid mixture is pumped from the bottom of the first stage to the top of the second stage reaction tube or tower and finally withdrawn from the bottom of this tower at atmospheric pressure.

The reaction mixture continuously withdrawn from the second stage is worked up by continuous filtration to separate the lime sludge from the aqueous filtrate containing the desired thiourea in solution. The separated sludge or solids are washed with the wash water. This wash water is combined with the initial filtrate. This mother liquor containing in solution all of the thiourea formed in the reaction is heated to evaporate water until the thiourea has been sufficiently concentrated to be separated as a crystalline precipitate. The crude product is recrystallized from an aqueous solution containing 100 g thiourea/1,000 ccm at room temperature.

The average yield thus obtained in this continuous operation of the process according to the invention amounted to 94 percent. The mother liquor from which the thiourea has been separated is substantially recycled to the first stage of the process. Thus, excellent yields and a very pure product can be easily and effectively produced by this continuous process so that it is uniquely adapted to a large scale industrial production of thiourea.

The invention is hereby claimed as follows:

1. A process for the production of thiourea which comprises introducing liquid hydrogen sulfide in a first stage into an aqueous suspension of calcium cyanamide for reaction therewith at temperatures of from about 10° to 80°C. under a reduced pressure corresponding to the vapor pressure of the reaction mixture at said temperatures up to about 300 mm. Hg and then completing the reaction in a second stage at a temperature of about 60° to 100°C. under approximately normal atmospheric pressure.

2. A process as claimed in claim 1 wherein said hydrogen sulfide is added in an approximately stoichiometric amount with reference to the calcium cyanamide.

3. A process as claimed in claim 1 wherein the reaction temperature in the second stage is maintained between about 70° and 80°C.

4. A process as claimed in claim 1 wherein both stages are carried out continuously by simultaneously introducing approximately stoichiometric amounts of hydrogen sulfide and calcium cyanamide in aqueous suspension into a first stage reaction zone having a free gas space above the liquid reaction mixture maintained under said reduced pressure, removing the heat of reaction from said first stage to maintain a maximum temperature therein of not more than about 60°C., continuously withdrawing said liquid reaction from first stage reaction zone and pumping it through a second stage reaction zone maintained at temperatures of about 60°C. to 100°C. and under approximately normal atmospheric pressure for completion of the reaction.

5. A continuous process as claimed in claim 4 wherein the second stage reaction zone is maintained at a temperature of about 70° to 80°C.

6. A continuous process as claimed in claim 4 wherein a liquid reaction mixture is continuously withdrawn from said second stage reaction zone containing said thiourea in aqueous solution and a solids content consisting predominately of calcium hydroxide, the solids are filtered off and washed with water while the filtrate is concentrated by evaporation of water, and a portion of the mother liquor obtained from at least one of said filtration and washing steps is recycled to said first stage reaction zone after the precipitated thiourea has been removed.

7. A continuous process as claimed in claim 4 wherein the average retention time of the reaction mixture in said second stage reaction zone is about 0.1 to 2 hours.

* * * * *